(12) United States Patent
Thawani et al.

(10) Patent No.: US 8,051,463 B2
(45) Date of Patent: Nov. 1, 2011

(54) METHOD AND SYSTEM FOR DISTRIBUTION OF CONFIGURATION INFORMATION AMONG ACCESS POINTS IN A WIRELESS LOCAL AREA NETWORK (WLAN) ACROSS A DISTRIBUTION SYSTEM (DS)

(75) Inventors: Manoj Thawani, Sunnyvale, CA (US); Mahesh Iyer, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1567 days.

(21) Appl. No.: 11/208,284

(22) Filed: Aug. 18, 2005

(65) Prior Publication Data

US 2006/0039360 A1  Feb. 23, 2006

Related U.S. Application Data

(60) Provisional application No. 60/602,396, filed on Aug. 18, 2004, provisional application No. 60/671,120, filed on Apr. 14, 2005.

(51) Int. Cl.
*H04L 12/66* (2006.01)
*G06F 7/04* (2006.01)
*G06F 15/16* (2006.01)
*G06F 17/30* (2006.01)

(52) U.S. Cl. .................................. 726/3; 370/352
(58) Field of Classification Search ........ 726/3; 370/352
See application file for complete search history.

(56) References Cited

U.S. PATENT DOCUMENTS 7,181,530 B1 * 2/2007 Halasz et al. ................ 709/238
7,430,181 B1 * 9/2008 Hong ........................... 370/254
7,636,338 B1 * 12/2009 Vu et al. ...................... 370/338
2005/0078624 A1 * 4/2005 Shu et al. ..................... 370/328
2006/0014536 A1 * 1/2006 Demirhan et al. ............ 455/434
2007/0247366 A1 * 10/2007 Smith et al. .................. 342/464

OTHER PUBLICATIONS

IEEE Std 802.11™, 2003 Edition, "Information technology—Telecommunications and information exchange between systems—Local and metropolitan area networks—Specific requirements—Part 11: Wireless LAN Medium Access Control (MAC) and Physical Layer (PHY) Specifications", pp. 9-65, Jun. 12, 2003.

* cited by examiner

*Primary Examiner* — Kambiz Zand
*Assistant Examiner* — Aubrey Wyszynski
(74) *Attorney, Agent, or Firm* — McAndrews, Held & Malloy, Ltd.

(57) ABSTRACT

Aspects of a method and system for distribution of configuration information among access points (AP) in a WLAN across a distribution system (DS) are presented. An AP, performing in a role of an AP-configurator may configure another AP, performing in a role of AP-client. The AP-configurator may distribute configurator configuration information to the AP-client. A configured AP-client may adopt a role of AP-configurator to configure a subsequent AP-client. An AP-configurator, or configured AP-client may subsequently configure a client station. The AP-configurator or configured AP-client may distribute configuration information to the client station. The configuration information may be based on previously distributed configurator configuration information. The method may enable client stations to be configured based on common configuration information that may be derived from configurator configuration information that was distributed by an AP-configurator. The client stations configured based on the common configuration information may communicate information in a secure network.

18 Claims, 13 Drawing Sheets

METHOD AND SYSTEM FOR DISTRIBUTION OF CONFIGURATION INFORMATION AMONG ACCESS POINTS IN A WIRELESS LOCAL AREA NETWORK (WLAN) ACROSS A DISTRIBUTION SYSTEM (DS)

CROSS-REFERENCE TO RELATED APPLICATIONS/INCORPORATION BY REFERENCE

This application makes reference to, claims priority to, and claims the benefit of:
U.S. Provisional Application Ser. No. 60/602,396 filed Aug. 18, 2004; and
U.S. Provisional Application Ser. No. 60/671,120 filed Apr. 14, 2005.

This application makes reference to:
U.S. application Ser. No. 11/207,302 filed Aug. 18, 2005;
U.S. application Ser. No. 11/207,262 filed Aug. 18, 2005;
U.S. application Ser. No. 11/207,658 filed Aug. 18, 2005;
U.S. application Ser. No. 11/208,081 filed Aug. 18, 2005;
U.S. application Ser. No. 11/208,310 filed Aug. 18, 2005;
U.S. application Ser. No. 11/208,275 filed Aug. 18, 2005;
U.S. application Ser. No. 11/208,346 filed Aug. 18, 2005;
U.S. application Ser. No. 11/207,661 filed Aug. 18, 2005;
U.S. application Ser. No. 11/207,301 filed Aug. 18, 2005; and
U.S. application Ser. No. 11/208,347 filed Aug. 18, 2005.

All of the above referenced applications are hereby incorporated herein by reference in their entirety.

FIELD OF THE INVENTION

Certain embodiments of the invention relate to wireless network communication. More specifically, certain embodiments of the invention relate to a method and system for distribution of configuration information among access points in a wireless local area network (WLAN) across a distribution system (DS).

BACKGROUND OF THE INVENTION

Currently, with some conventional systems, setting up a wireless network generally requires significant interaction and technical knowledge on the part of a user setting up the network, especially when the user is configuring security options for the network. For computer savvy users, the tasks associated with setting up a wireless network can be time consuming. However, for inexperienced computer users, the tasks associated with setting up a wireless network can be more challenging and consumes significantly greater time than required by computer savvy users.

In general, 802.11-based networks require a significant amount of user interaction during the configuration process. Typically, with conventional 802.11-based networks, the user needs to configure a non-access point station (STA) to associate with an access point (AP), which may require a number of settings to be selected on the STA, and some knowledge of the default configuration of the AP. The user may then access an HTML-based menu on the new AP in order to set various configuration parameters, many of which are difficult for novice and for intermediate users to understand and set correctly. New APs generally start with a configuration that provides no network security, and which utilize a default network name (SSID) that is selected by the manufacturer such as, for example, "Manufacturer Name", "Default", or "wireless". With the proliferation of 802.11 networks, users often experience confusion and network problems when their new AP uses the same SSID as a neighboring AP.

These problems are compounded as the size of an 802.11 wireless network grows. A user may decide to deploy additional network access devices such as access points to a home or small office network in order to expand the size of the network or to provide better signal coverage in those areas in which signal strength may be poor. In such instances, setup and configuration of the access points and non-mobile STAs present many challenges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for distribution of configuration information among access points in a wireless local area network (WLAN) across a distribution system (DS) substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
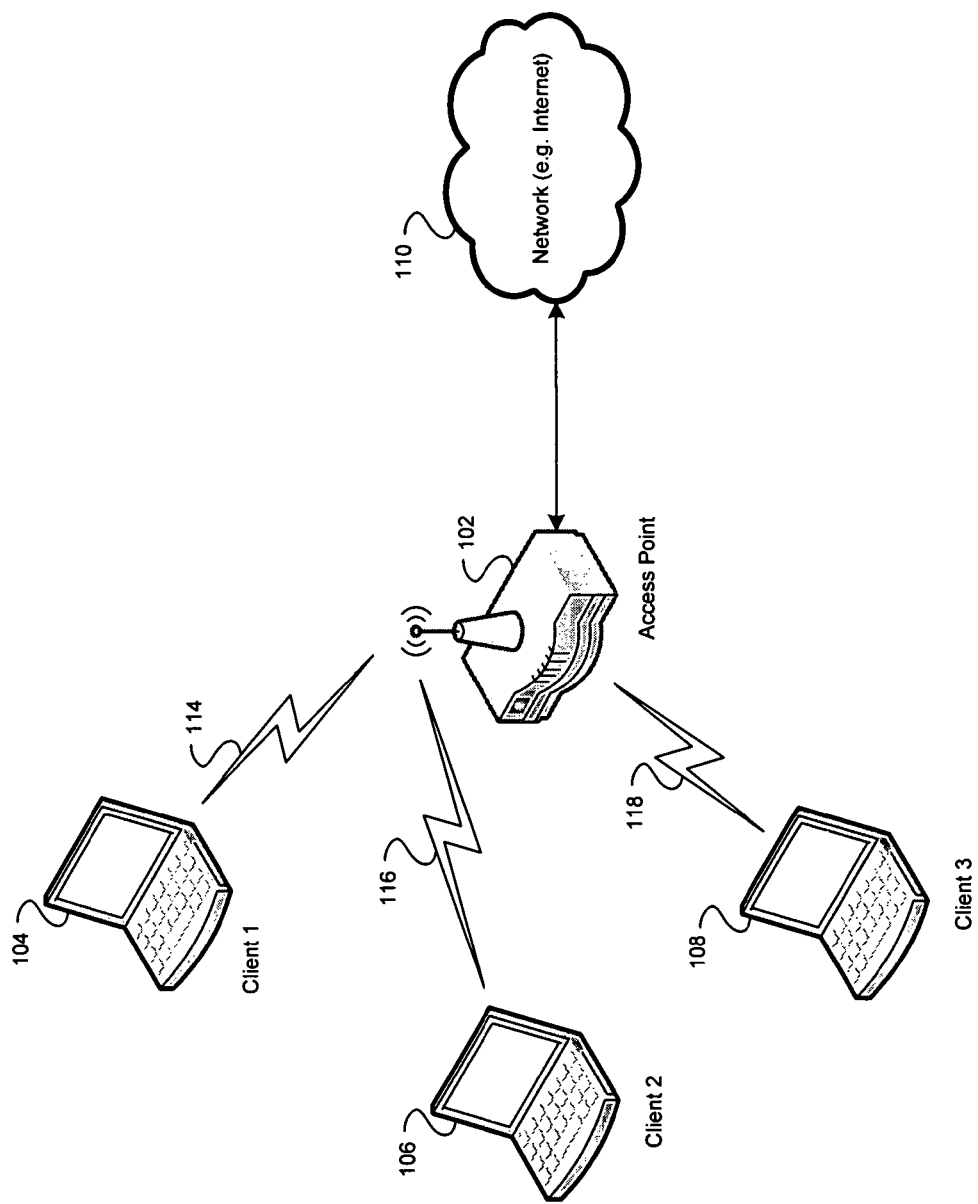
FIG. 1a is a block diagram of an exemplary wireless network, which may be utilized in connection with an embodiment of the invention.

Certain embodiments of the invention may be found in a method and system for transporting configuration protocol messages across a distribution system (DS) in a wireless local area network (WLAN). In accordance with an embodiment of the invention, an AP functioning as an AP-configurator may configure another AP functioning as an AP-client. The AP-configurator may distribute configurator configuration information to the AP-client. A configured AP-client may function as an AP-configurator to configure a subsequent AP-client. An AP-configurator, or configured AP-client may subsequently configure a client station. The AP-configurator or configured AP-client may distribute configuration information to the client station. The configuration information may be based on, for example, previously distributed configurator configuration information. The method may enable client stations to be configured based on common configuration information that may be derived from configurator configuration information that was distributed by an AP-configurator. The client stations configured based on the common configuration information may communicate information in a secure network.

In IEEE 802.11 WLAN systems, wireless terminal devices, or wireless terminals, for example personal computers or personal digital assistants, may communicate via radio frequency (RF) channels that may be monitored by unauthorized parties at terminal devices that were not intended to participate in the communication. In response, IEEE 802.11 provides specifications that enable wireless terminal devices to communicate utilizing encryption techniques. The utilization of encryption techniques to securely exchange information between wireless terminals may prevent unauthorized parties from determining the information content carried in communications via a secure RF channel. Prior to being enabled to utilize a WLAN, the wireless terminal device may be required to obtain authorization through a process that comprises authentication.

Enabling a wireless terminal device to obtain authorization and to utilize encryption may require a user to manually configure the wireless terminal. This manual configuration may require a user to possess extensive knowledge about the WLAN that may exceed that of a typical WLAN user. An aspect of the invention may comprise a method that reducing user interaction and knowledge required to configure a wireless terminal for secure communications in an IEEE 802.11 wireless local area network (WLAN). Components in a system, in accordance with an embodiment of the invention, may comprise a configurator, which may alternatively be referred to as a configurator terminal, configurator device, or configurator station, and a client, which may be alternatively referred to as a client terminal, client device, or client station. A configurator station, or a client station, may be referred to as a station.

The configurator may be a wireless and/or wired terminal device, an Ethernet switching device, or other device in an IEEE 802 local area network (LAN) and/or WLAN. The configurator may be located in an access point, for example. The configurator may provide a service to configure clients, which may be wireless terminal devices, thereby enabling the configured clients to utilize secure RF channels with little interaction required from the user. The client may be a wireless and/or wired terminal device, an Ethernet switching device, or other device in an IEEE 802 LAN and/or WLAN.

FIG. 1a is a block diagram of an exemplary wireless network, which may be utilized in connection with an embodiment of the invention. Referring to FIG. 1a, there is shown an access point (AP) 102, and a plurality of client stations (STA) 104, 106, and 108, a plurality of RF channels 114, 116, and 118, and a network 110. The STAs 104, 106, and 108 may be wireless terminals such as a PC, a laptop, or a PDA with integrated or plug-in 801.11 capabilities. For example, the PC may utilize a wireless network interface card (NIC) and the laptop or PDA may comprise integrated 801.11 capabilities. The network 110 may be a private or public network, for example, a service provider or the Internet.

In operation, an AP 102 may serve dual roles in a WLAN comprising a station role and a distribution role, an AP 102 may perform a station role when communicating with a STA 104. The AP 102 may perform a distribution role when communicating information via the network 110. The STAs 104, 106 and 108 may comprise non-AP stations. In instances where the STAs 104, 106, and 108 are configured, they may communicate with the AP 102 via corresponding secure RF channels 114, 116, and 118, respectively. The AP 102 may communicate information received from a configured STA 104, 106, or 108 via the Internet 110. In instances where the STAs 104, 106, or 108 are unconfigured, they may communicate with the configurator 102 to request configuration information. The configurator 102 may configure a requesting STA 104, 106, or 108 via a corresponding RF channel 114, 116, or 118.

In general, the AP 102 may be adapted to facilitate the registration and/or authentication of client stations so that the client stations may become associated with the AP 102 in secure communications network. Various embodiments of the invention may comprise software that executes in the AP 102 and/or client station 104 in order to facilitate registration and/or authentication. The software may enable the AP 102 to register client stations 104 in a secure communications network. An AP 102 may register a client station 104 by storing information, for example a media access control (MAC) address or an Internet protocol (IP) address, associated with the client station 104. Registration may also comprise configuration of the client station 104 by the AP 102.

An AP 102 may configure a client station 104 by performing software configuration tasks that enable the client station 104 to communicate information to another STA 106 in a secure communications network. In one embodiment of the invention, exemplary software configuration tasks may comprise generating a passphrase at an AP 102 and communicating the passphrase securely, to the client station 104. The passphrase may be utilized to encrypt information communicated between STAs and APs in a secure communications network. The secure communications network may comprise the AP 102, and one or more client stations such as client station 104, that are configured by the AP 102. A system for secure automatic registration in a communications network may comprise an access point 102 that registers a client device 104 without requiring that software configuration tasks be performed by an end user. In this regard, an end user does not have to manually enter configuration information on the AP 102 and/or the client station 104 in order to register and authenticate the client station 104.

In various embodiments of the invention, activating a hardware button and/or software button may register a client station 104 with an AP 102. This may comprise activating a hardware and/or software enabled button located on an AP 102, and by activating a hardware and/or software enabled button located on a client station 104. A hardware button may comprise a physical button that may be dedicated to performing a function related to automatic registration security. A software enabled button may comprise a software icon that appears on a user interface. A hardware button and/or software enabled button may be activated as a result of a method of physical action on the part of a user. Activation of a hardware and/or software enabled button located on an AP 102, and subsequent activation of a hardware and/or software enabled button located on a client station 104, may result in a registering of the client station 104 with the AP 102. The client station 104 may also be configured, by the AP 102, to communicate information in a secure communications network.

Some IEEE 802.11 WLANs utilize a technology for network security based on Wi-Fi protected access (WPA), or second generation WPA (WPA2). For example, configuration parameters, such as a passphrase or SSID, may require manual entry by a user at an AP 102 and/or at a client station 104 in some conventional WPA-based and/or WPA2-based WLANs. In various embodiments of the invention, in order to provide support for WPA and/or WPA2, the passphrase and/or SSID may be generated by an AP 102, and entered at a client station 104, by activating a hardware and/or software enabled button located on an AP 102, and/or located on a client station 104. Subsequent to configuration, in accordance with various embodiments of the invention, the configured client station 104 may communicate information in a WPA-based or WPA2-based WLAN. A client station 104, which is configured with a passphrase and/or SSID in accordance with various embodiments of the invention, may communicate in a secure communication network with a WLAN station 106, for which the passphrase and/or SSID were not configured in accordance with various embodiments of the invention. For example, the passphrase and SSID may be configured at the WLAN station 106 as a result of manual entry by a user.

Figure 1B:
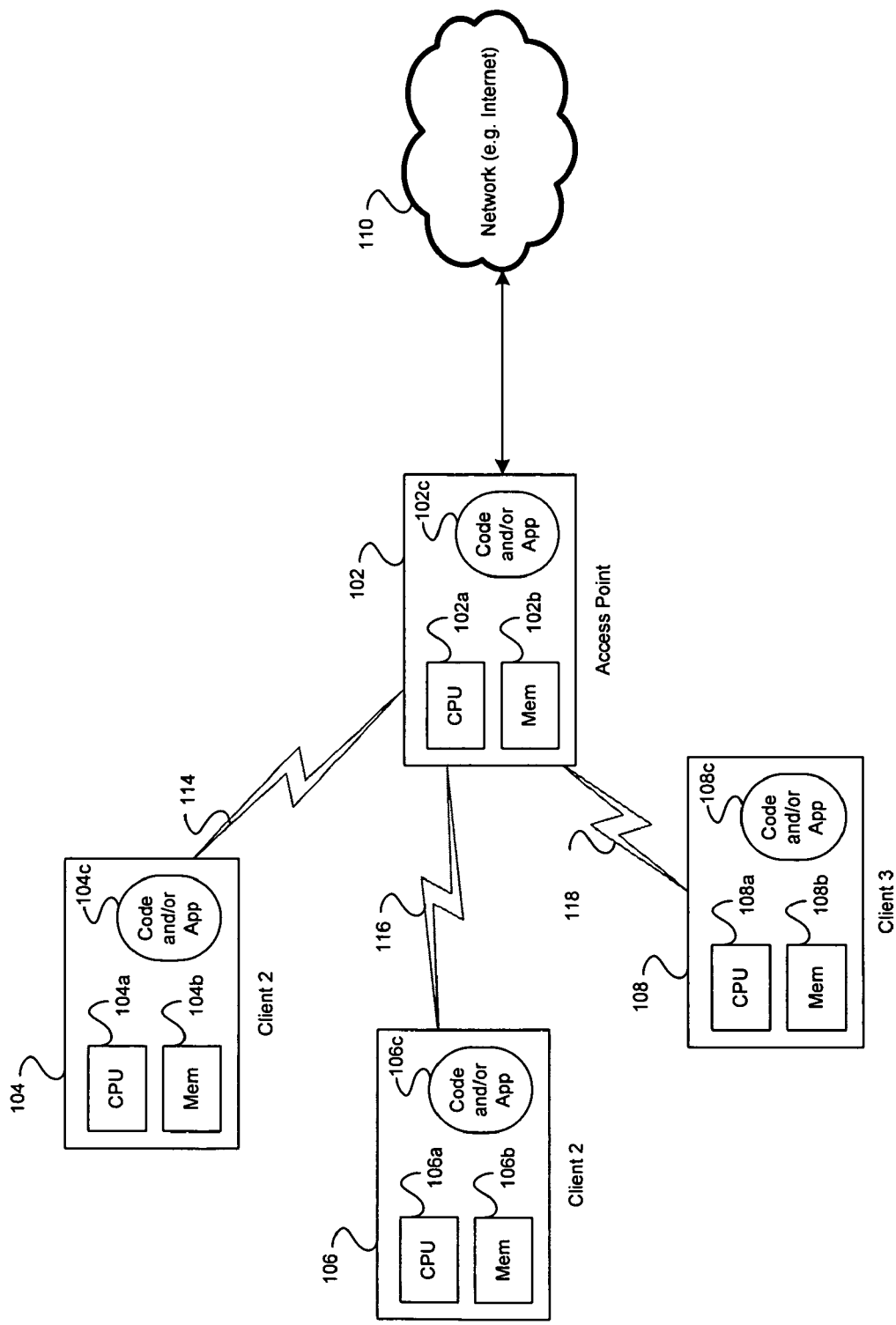
FIG. 1b is a block diagram of a software environment in an exemplary wireless network, which may be utilized in connection with an embodiment of the invention.

FIG. 1b is a block diagram of a software environment in an exemplary wireless network, which may be utilized in connection with an embodiment of the invention. Referring to FIG. 1b, there is shown an access point (AP) 102, and a plurality of client stations (STA) 104, 106, and 108, a plurality of RF channels 114, 116, and 118, and a network 110. The AP 102 may further comprise a central processing unit (CPU) 102a, system memory 102b, and code and/or application software 102c. The STA 104 may further comprise a CPU 104a, system memory 104b, and code and/or application software 104c. The STA 106 may further comprise a CPU 106a, system memory 106b, and code and/or application software 106c. The STA 108 may further comprise a CPU 108a, system memory 108b, and code and/or application software 108c. The AP 102, and the STAs 104, 106 and 108 may be substantially as described in FIG. 1a.

The CPU 102a, 104a, 106a or 108a may be adapted to perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The system memory 102b, 104b, 106b or 108b may comprise suitable logic, circuitry, and/or code to be utilized to store, or write, and retrieve, or read, information. It may comprise a plurality of memory technologies such as random access memory (RAM). The code and/or application software 102c, 104c, 106c or 108c may comprise a computer program.

In operation, the system memory 102b may comprise machine-readable storage having stored thereon at least one code section for enabling communication of information in a secure communication system. The at least one code section may be executable by the CPU 102a. The at least one code section may cause the CPU 102a to perform steps related to registering and configuring a client station 104 with the AP 102.

In operation, the system memory 104b, 106b or 108b may comprise machine readable storage having stored thereon at least one code section for enabling communication of information in a secure communication system. The at least one code section may be executable by the CPU 104a, 106a or 108a, respectively. The at least one code section may cause the CPU 104a, 106a or 108a to perform steps related to requesting registration and configuration of the client station 104, 106 or 108 with the AP 102.

Figure 2:
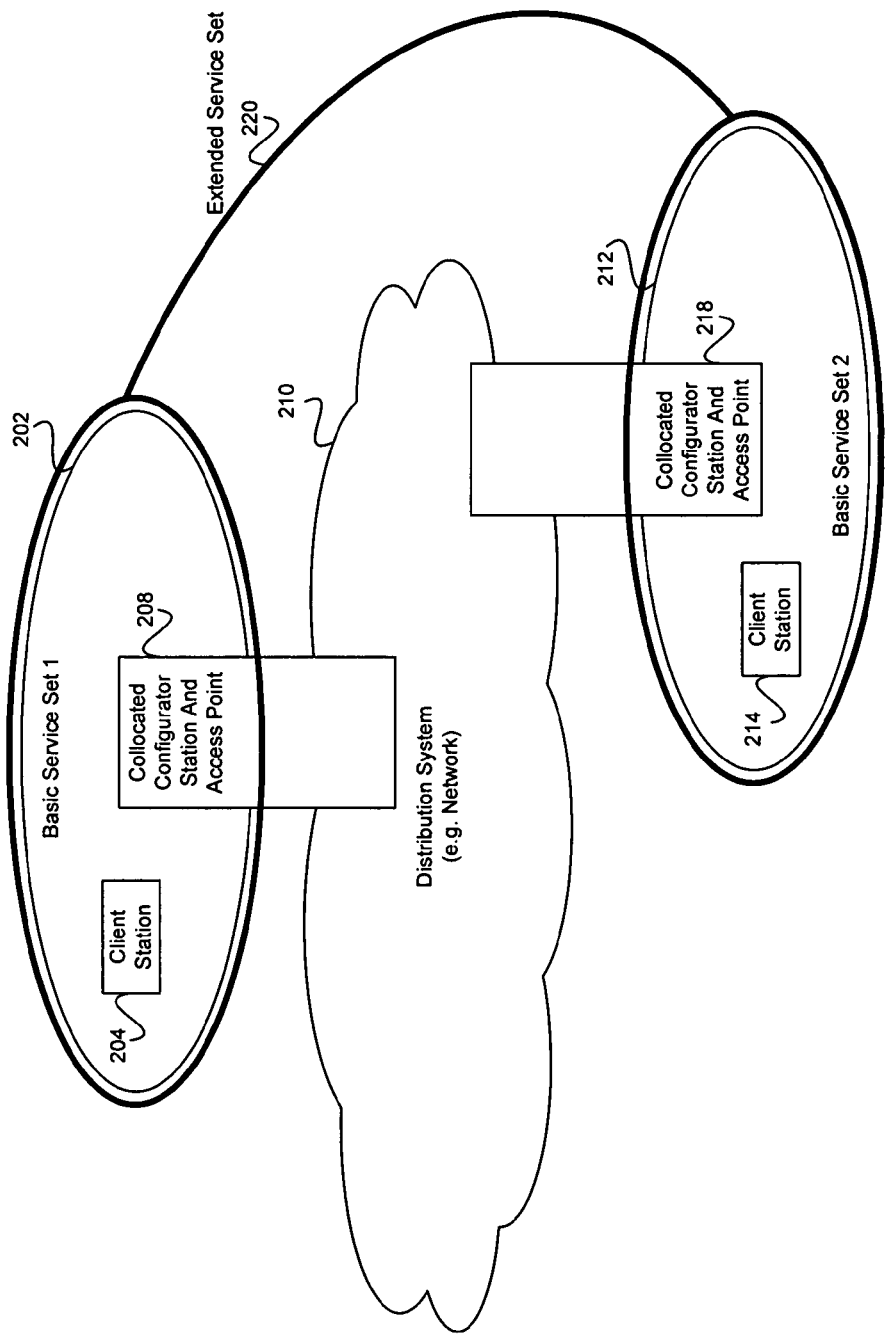
FIG. 2 is a block diagram of an exemplary system for wireless data communications comprising an ESS with collocation of configurators and access points (AP), in accordance with an embodiment of the invention.

FIG. 2 is a block diagram of an exemplary system for wireless data communications comprising an ESS with collocation of configurators and access points (AP), in accordance with an embodiment of the invention. With reference to FIG. 2 there is shown a distribution system (DS) 210, and an extended service set (ESS) 220. The ESS 220 may comprise a first basic service set (BSS) 202, and may include a second BSS 212, and may also include additional BSSs. The first BSS 202 may comprise a client station 204, and a collocated configurator station and access point 208. The second BSS 212 may comprise a client station 214, and a collocated configurator station and access point 218.

The collocated configurator station and access point 208 may be adapted to function as an access point or as a configurator station. Throughout this application, for simplicity, collocated configurator station and access point 208 may be referred to as collocated device 208. Accordingly, the collocated device 208 functioning as an access point refers to the collocated configurator station and access point 208 functioning as an access point. Additionally, the collocated device 208 functioning as a configurator refers to the collocated configurator station and access point 208 functioning as a configurator.

A BSS 202 may comprise a plurality of proximately located stations that may communicate wirelessly, via a wireless medium. A BSS 202 that is also associated with an ESS 220 may be referred to an infrastructure BSS. The wireless medium may comprise an RF channel. The ESS 220, comprising a plurality of BSS 202 and 212, for example, may be identified by a unique service set identifier (SSID). Stations 204 and 214, associated with an ESS 220, may communicate via a wireless medium and/or via a distribution system medium, for example the DS 210. The DS 210 may comprise a distribution system medium that further comprises a wired medium and/or a wireless medium. A wired medium may comprise a physical communications channel that enables STA 204 to transmit information via a plurality of communications technologies, for example electrical or optical signals. In an IEEE 802.11 WLAN, the collocated configurator station and access point 208 or 218 may comprise the functionality of an AP and the functionality of a configurator. In an IEEE 802.11 WLAN, an AP may comprise the functionality of a station.

The collocated device 208 functioning as an AP, may enable STA 204 to transmit information via the DS 210. The DS 210 may utilize media access control (MAC) layer IEEE 802 addressing and/or network layer addressing. If the DS 210 utilizes MAC layer IEEE 802 addressing, the collocated device 208 functioning as an AP, and/or collocated configurator station and access point 218 functioning as an AP, may comprise Ethernet switching device functionality. If the DS 210 utilizes network layer addressing, the collocated device 208 functioning as an AP, and/or collocated configurator station and access point 218 functioning as an AP, may comprise router functionality.

The collocated device 208 functioning as a configurator may configure a STA 204, thereby enabling the STA 204 to communicate wirelessly in a secure IEEE 802.11 network that utilizes encryption. The collocated device 208 functioning as a configurator, may configure a STA 204 by communicating information to the STA 204 comprising an SSID and an encryption key. The encryption key may also be referred to as a passphrase. A configured STA 204 may be authorized to utilize an IEEE 802.11 network based on the received configuration information from the collocated device 208 functioning as a configurator. A process by which the STA 204 is authenticated may comprise configuration of the STA 204. Various embodiments of the invention comprise a method and a system for configuring the STA 204 while requiring less manual intervention from a user than is the case with some conventional methods and/or systems for configuring the STA 204.

A non-AP station, for example, the client station 204 within the BSS 202 may subsequently form an association with the collocated device 208 functioning as an AP. The STA 204 may communicate an association request to the collocated device 208 functioning as an AP, based on the SSID that was received by the STA 204 during configuration. The collocated device 208 functioning as an AP, may communicate an association response to the STA 204 to indicate to the STA 204 the result of the association request. By associating with the collocated device 208 functioning as an AP, the station 204 may become a member of BSS 202. Furthermore, by obtaining membership in BSS 202, the STA 204 may become authorized to engage in secure wireless communication with other client stations in the ESS 220. Similarly, non-AP client station 214 within a BSS 212 may form an association with the collocated configurator station and access point 218 functioning as an AP, enabling the STA 214 to become a member of BSS 212.

Subsequent to the formation of an association between the client station 204 and the collocated device 208 functioning as an AP, the collocated device 208 functioning as an AP, may communicate accessibility information about the client station 204 to other APs associated with the ESS 220, such as the collocated configurator station and access point 218 functioning as an AP. The communication of reachability information about the client station 204 may enable stations that are not associated in BSS 202, but are associated in ESS 220, to communicate with the client station 204.

The DS 210 may provide an infrastructure that enables a client station 204 in one BSS 202, which has been authenticated and configured in accordance with various embodiments of the invention, to engage in a secure wireless communication with a client station 214 in another BSS 212. The collocated device 208 functioning as an AP, or collocated configurator station and access point 218 functioning as an AP, may provide a facility by which a station in a BSS 202, or BSS 212, may communicate information via the DS 210. The client station 204 in BSS 202 may communicate information to a client station 214 in BSS 212 by transmitting the information to collocated device 208 functioning as an AP. The collocated device 208 functioning as an AP may transmit the information via the DS 210 to the collocated configurator station and access point 218 functioning as an AP, which, in turn, may transmit the information to station 214 in BSS 212.

In various embodiments of the invention, a collocated device 208 in a current BSS 202 may configure a collocated device 218 in a subsequent BSS 212. The configured collocation device 218 may subsequently configure a client station 214 located in a common subsequent BSS 212. The collocated device 218 may be configured by the collocated device 208 via a wireless interface or via a wired interface. A collocated device 208 that functions in a role as an AP-configurator may configure another collocated device 218. A collocated device 218 that functions in a role as an AP-client may be configured by another collocated device 208.

Throughout this application, for simplicity, a collocated device 208 that functions in a role as an AP-configurator may be referred to as a collocated device 208 functioning as an AP-configurator. A collocated device 218 that functions as an AP-client may be referred to as a collocated device 218 functioning as an AP-client.

In an ESS 220 that comprises a plurality of collocated devices 208 functioning as a configurator, an individual collocated device 208 functioning as a configurator may generate configuration information that differs from configuration information generated by a subsequent collocated device 218 functioning as a configurator. Client stations 204 and 214 that are members of a common ESS 220 may require common configuration information in order to communicate information in a secure communications network. Some conventional approaches to the distribution of common configuration information across an ESS 220 may require human intervention to manually configure the plurality of collocated devices 208 functioning as a configurator within a common ESS 220. Various embodiments of the invention provide a method and a system by which common configuration information may be distributed among a plurality of collocated devices 208 functioning as a configurator, within a common ESS 220, while reducing required human intervention in comparison to some of the conventional approaches.

Figure 3:
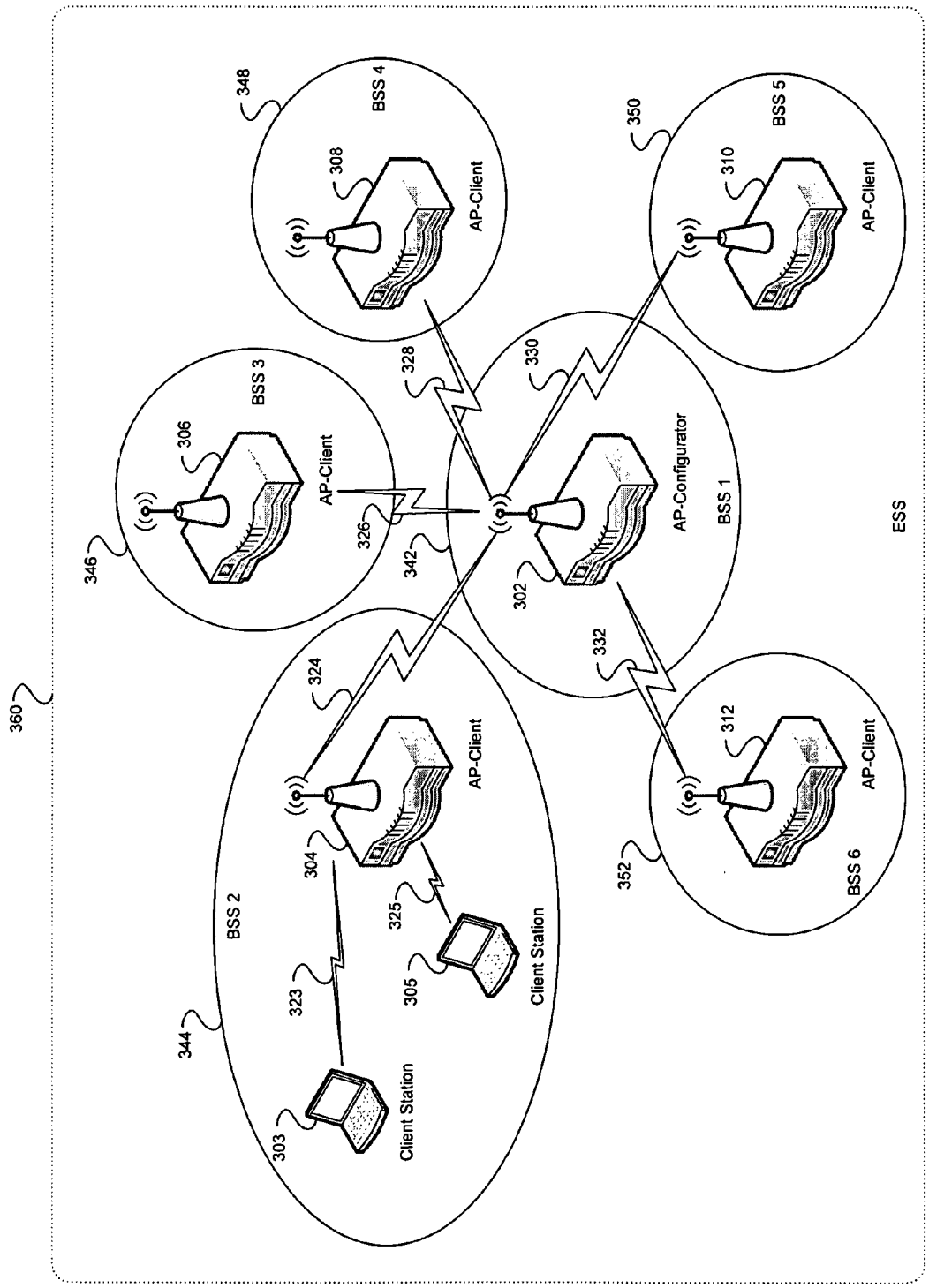
FIG. 3 is a block diagram of an exemplary star configuration comprising an AP-configurator and a plurality of AP-clients, in accordance with an embodiment of the invention.

FIG. 3 is a block diagram of an exemplary star configuration comprising an AP-configurator and a plurality of AP-clients, in accordance with an embodiment of the invention. Referring to FIG. 3, there is shown an ESS 360. The ESS 360 may comprise a plurality of BSSs 342, 344, 346, 348, 350 and 352. The BSS 342 may comprise an AP-configurator 302. The BSS 344 may comprise an AP-client 304, and a plurality of client stations 303 and 305. The BSS 346 may comprise an AP-client 306. The BSS 348 may comprise an AP-client 308. The BSS 350 may comprise an AP-client 310. The BSS 352 may comprise an AP-client 312. Each of the AP-configurator 302, and plurality of AP-clients 304, 306, 308, 310 and 312, may comprise the functionality of a collocated device 208. The AP-configurator 302 may distribute configurator configuration information to a plurality of AP-clients via a wireless distribution system (WDS). A WDS may comprise a DS 210, wherein the DS 210 comprises a wireless medium. The configurator configuration information stored at the AP-configurator 302 may comprise an SSID, and/or a passphrase. The AP-configurator 302 may utilize RF channels 324, 326, 328, 330, and 332 to communicate with AP-clients 304, 306, 308, 310, and 312, respectively, via the WDS. The AP-client 304 may utilize RF channels 323 and 325 to communicate with client stations 303 and 305, respectively, within the BSS 344.

The distribution of configurator configuration information from an AP-configurator 302 to one or more AP-clients 304, 306, 308, 310 and/or 312, may enable a system operator to configure an AP-configurator 302 that may subsequently distribute the configurator configuration information to AP-clients 304, 306, 308, 310 and/or 312 via one or more RF channels 324, 326, 328, 330 and/or 332. The amount of user interaction that is required is reduced in comparison to some conventional approaches, for example manual configuration of AP-clients 304, 306, 308, 310 and/or 312.

Each AP-client 304, 306, 308, 310 or 312, or AP-configurator 302 may be located in a distinct BSS. The AP-configurator 302, which may be located in BSS 342, may comprise a collocated device 208 that functions as a configurator. The configured AP-client 304, for example, which may be located in a BSS 344, may comprise a collocated device 208 that functions as a configurator for client stations 303 and 305 that are also located within the BSS 344. Each BSS 342, 344, 346, 348, 350 or 350, in which an AP-client or AP-configurator 302 may be located, may comprise a subnetwork within an ESS 360.

The configuration illustrated in FIG. 3 may be referred to as, for example, a star-shaped range extender configuration. The star-shaped range extender configuration may enable an AP-configurator 302 to distribute configurator configuration information to an AP-client 304, via a WDS when the AP-configurator 302 and AP-client 304 are located at a distance that may be reached by a single RF channel 324. The star-shaped range extender configuration may enable a client station 204 to be configured for membership in an ESS 360 even though the client station 204 is at a distal location that may not be reachable via an RF channel 324 from the AP-configurator 302.

The AP-configurator 302 may transmit configurator configuration information via the RF channel 324 to configure the AP-client 304. The configurator configuration information received by the AP-client 304 may enable the AP-client 304, as a collocated device 208 functioning as a configurator, to subsequently configure a client station 303 that is located in a common BSS 344 with the AP-client 304. The BSS 344 may comprise, but is not restricted to being, a subnetwork within the ESS 360. The client station 303 that may communicate with the configured AP-client 304, via an RF channel 323, may be configured for secure communications in the ESS 360 based on configuration information received from the AP-client 304 that serves a role as a collocated device 208 functioning as a configurator.

Figure 4:
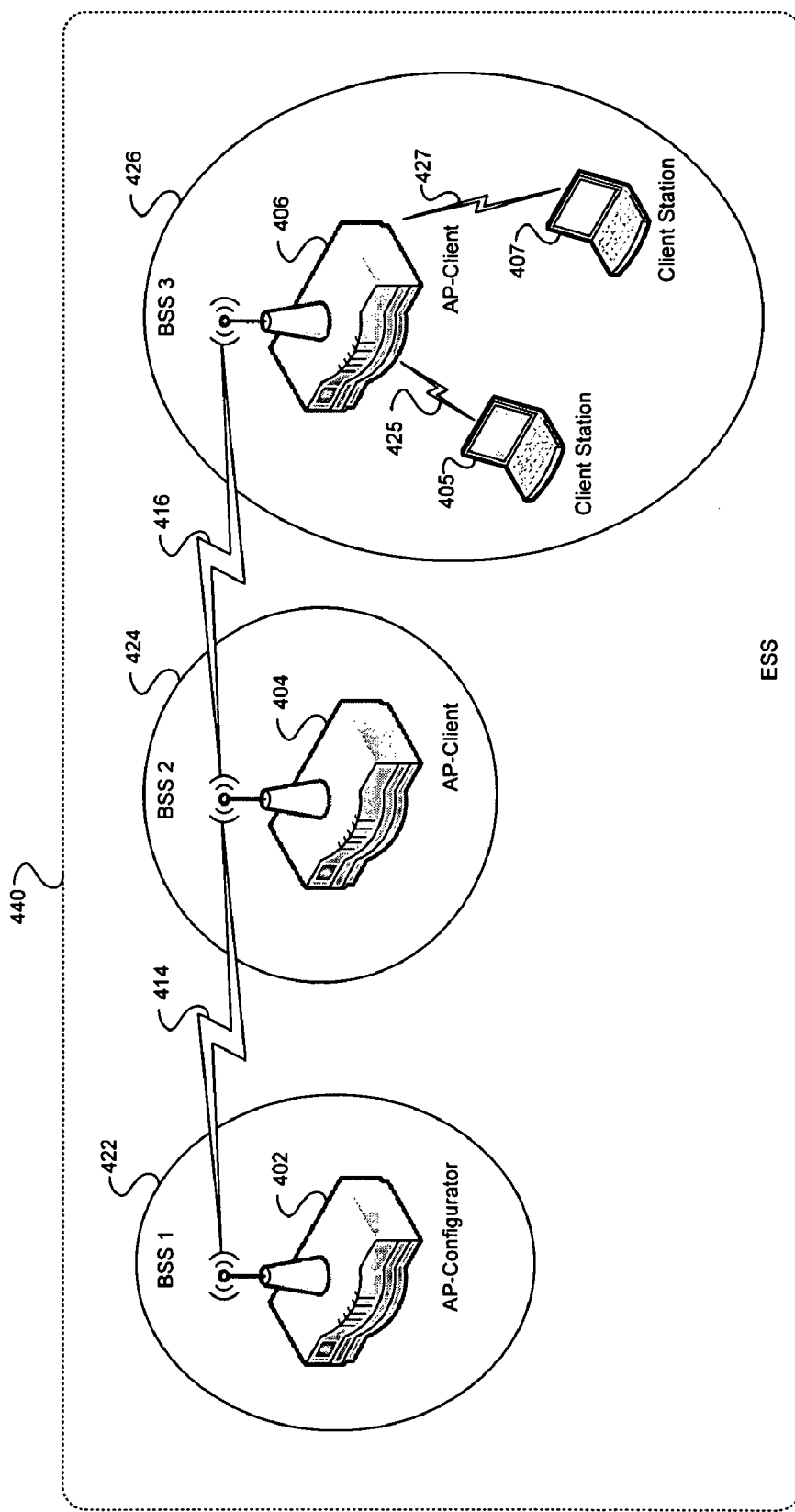
FIG. 4 is a block diagram of an exemplary range extender configuration comprising an AP-configurator and a plurality of AP-clients, in accordance with an embodiment of the invention.

FIG. 4 is a block diagram of an exemplary range extender configuration comprising an AP-configurator and a plurality of AP-clients, in accordance with an embodiment of the invention. Referring to FIG. 4, there is shown an ESS 440. The ESS 440 may comprise a plurality of BSSs 422, 424 and 426. The BSS 422 may comprise an AP-configurator 402. The BSS 424 may comprise an AP-client 404. The BSS 426 may comprise an AP-client 406, and a plurality of client stations 405 and 407. Each of the AP-configurator 402, and plurality of AP-clients 404 and 406, may comprise the functionality of a collocated device 208. The AP-configurator 402 may distribute configurator configuration information to the AP-client 404 via a WDS. The configured AP-client 404 may adopt a role of an AP-configurator to distribute configurator configuration information to the AP-client 406 via a WDS. The AP-configurator 402 may utilize RF channel 414 to communicate with AP-client 404 via the WDS. The AP-client 404 may utilize RF channel 416 to communicate with AP-client 406 via the WDS. The AP-client 406 may utilize RF channels 425 and 427 to communicate with client stations 405 and 407 respectively, within the BSS 426.

The configuration illustrated in FIG. 4 may be referred to as a linear range extender configuration. The linear range extender configuration may enable an AP-configurator 402 to distribute configurator configuration information to an AP-client 406, via a WDS when the AP-configurator 402 and AP-client 406 are located at a distance that may be too great to be reached by a single RF channel 414. The linear range extender configuration may enable a client station 405 to be configured for membership in the ESS 440 even though the client station 405 is at a distant location that may not be reachable via an RF channel 414 from the AP-configurator 402. Various embodiments of the invention may comprise a plurality of network topologies and may not be restricted to linear or star configurations.

The configured AP-client 404 that functions as an AP-configurator may transmit configurator configuration information via the RF channel 416 to configure the AP-client 406. The configurator configuration information received by the AP-client 406 may enable the configured AP-client 406, as a collocated device 208 functioning as a configurator, to subsequently configure a client station 405 that is located in a common BSS 426 with the configured AP-client 406. The client station 405 that may communicate with the configured AP-client 404, via RF channel 425, may be configured for secure communications in an ESS 440 based on configuration information received from the AP-client 406 that serves a role as a collocated device 208 functioning as a configurator.

Figure 5:
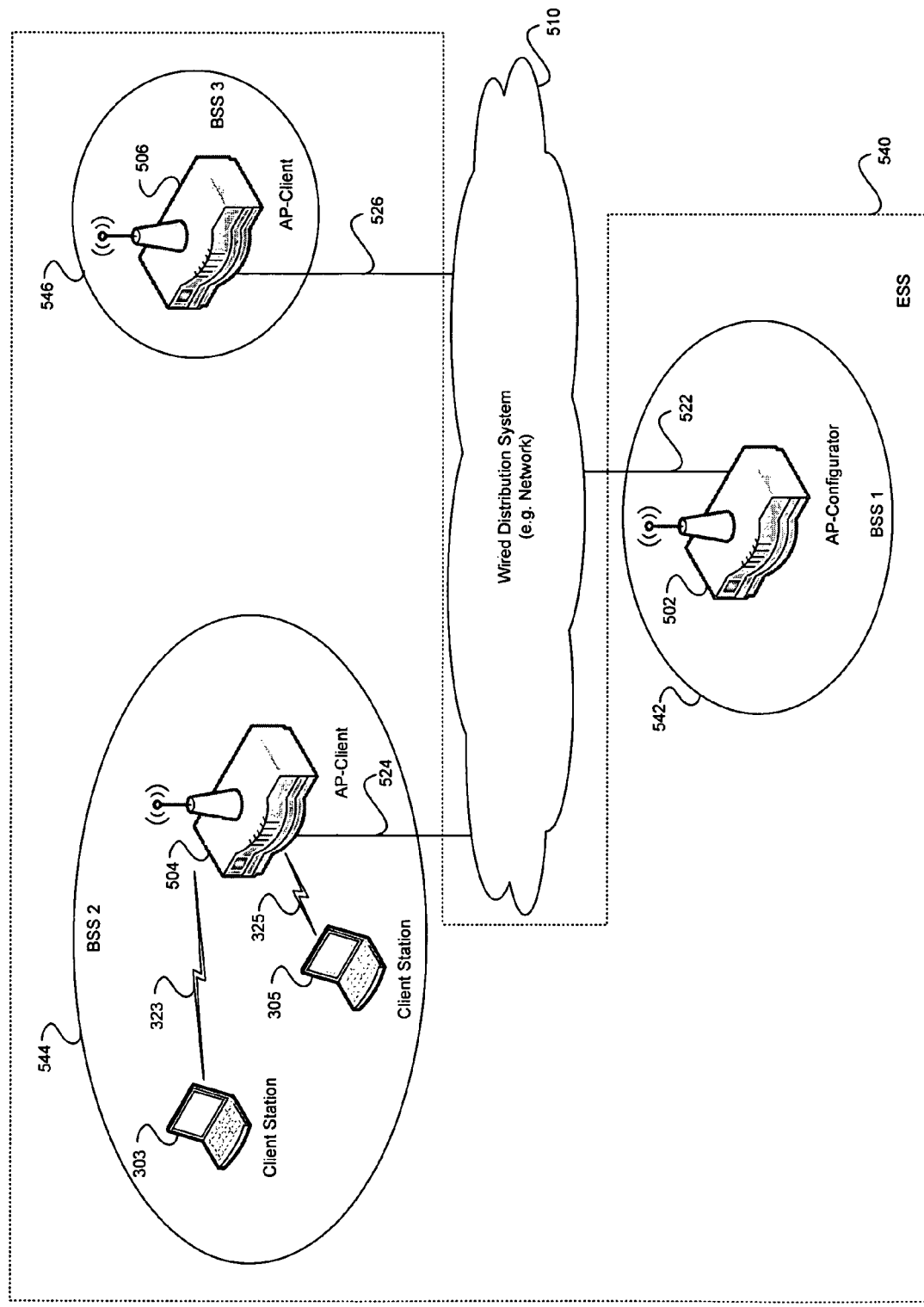
FIG. 5 is a block diagram of an exemplary wired DS configuration comprising an AP-configurator and a plurality of AP-clients, in accordance with an embodiment of the invention.

FIG. 5 is a block diagram of an exemplary wired DS configuration comprising an AP-configurator and a plurality of AP-clients, in accordance with an embodiment of the invention. Referring to FIG. 5, there is shown an ESS 540 and a wired distribution system (DS) 510. The ESS 540 may comprise a plurality of BSSs 542, 544, and 546. The BSS 542 may comprise an AP-configurator 502. The BSS 544 may comprise an AP-client 504, and a plurality of client stations 303 and 305. The BSS 546 may comprise an AP-client 506. Each of the AP-configurator 502, and plurality of AP-clients 504 and 506, may comprise the functionality of a collocated device 208. The AP-configurator 502 may distribute configurator configuration information to a plurality of AP-clients via a wired interface 522 that may be coupled to a wired DS 510. The AP-configurator 502 may utilize the wired interface 522 to communicate with AP-clients 504 and 506, respectively, via the wired DS. The AP-client 504 may utilize RF channels 323 and 325 to communicate with client stations 303 and 305, respectively, within the BSS 344.

The AP-configurator 502, which may be located in BSS 542, may comprise a collocated device 208 that functions as a configurator. The configured AP-client 504, for example, which may be located in a BSS 544, may comprise a collocated device 208 that functions as a configurator for client stations 303 and 305 that are also located within the BSS 544.

The AP-configurator 502 may transmit configurator configuration information via the wired interface 522, and the wired DS 510, to configure the AP-client 504. A wired DS 510 may comprise a DS 210, wherein the DS 210 comprises a wired medium. The configurator configuration information received by the AP-client 504 may enable the AP-client 504, as a collocated device 208 functioning as a configurator, to subsequently configure a client station 303 that is located in a common BSS 544 with the AP-client 504. The BSS 544 may comprise a subnetwork within the ESS 540. The client station 303 that may communicate with the configured AP-client 504, via an RF channel 323, may be configured for secure communications in the ESS 540 based on configuration information received from the AP-client 504 that serves a role as a collocated device 208 functioning as a configurator.

Figure 6:
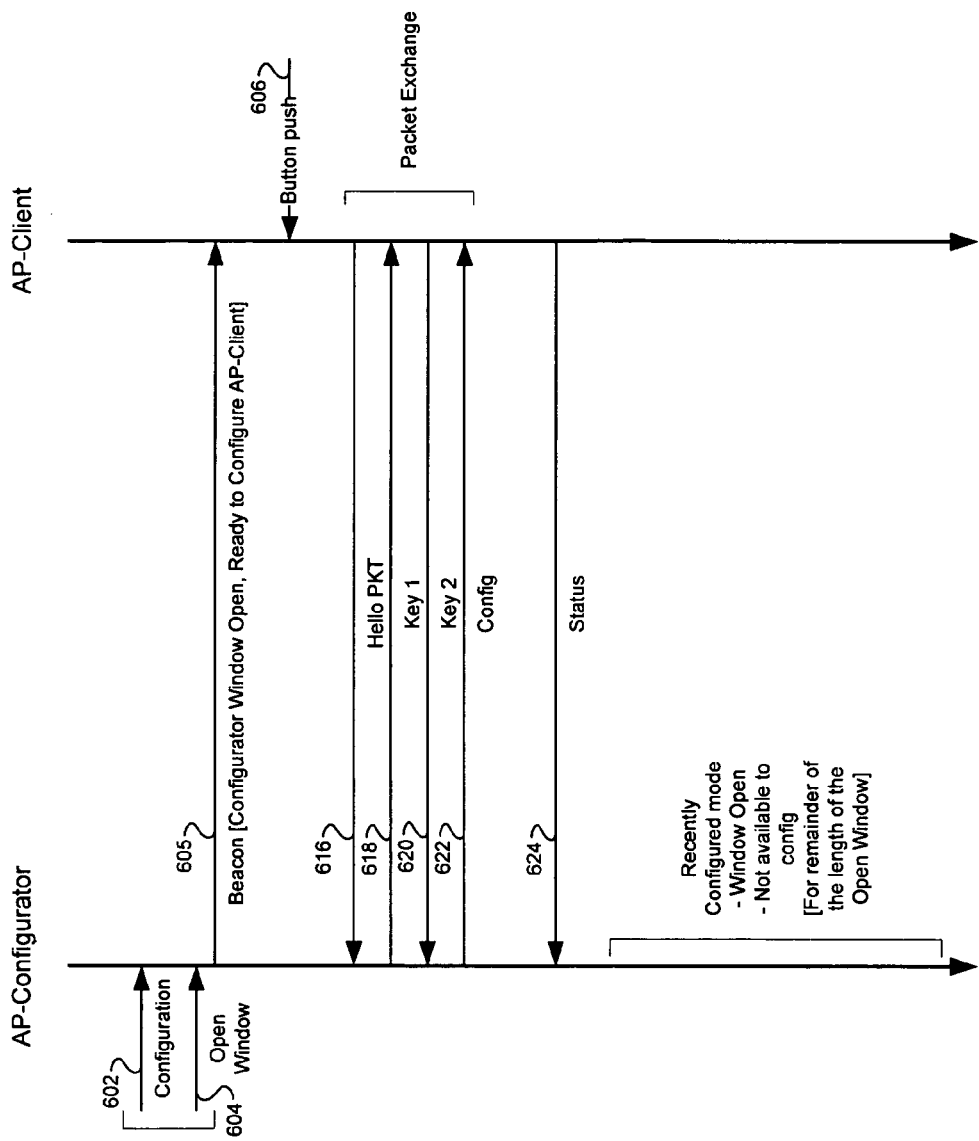
FIG. 6 is a diagram illustrating exemplary message exchanges between an AP-configurator and an AP-client via a WDS, in accordance with an embodiment of the invention.

FIG. 6 is a diagram illustrating exemplary message exchanges between an AP-configurator and an AP-client via a WDS, in accordance with an embodiment of the invention.

In step 602, an AP-configurator 302 may be configured based on an activation of a button located at the AP-configurator 302. In step 604, a configured AP-configurator 302 may open a configurator timing window for a specific time duration. The specific time duration during which the configurator timing window remains open subsequent to a short button activation, for example, may be configured at the AP-configurator 302. The opening of the configurator timing window may correspond to the start of a time duration during which a client station 303, or AP-client 304, may be configured by the AP-configurator 302, or by the configured AP-client 304 that functions as an AP-configurator.

In step 605, at a time instant subsequent to the opening of the configurator timing window in step 604, the AP-configurator 302, may transmit IEEE 802.11 beacon frames via the WDS comprising configuration enablement information and/or authentication enablement information, in accordance with an embodiment of the invention. The configuration enablement information may indicate that the configurator timing window is open, and that the AP-configurator 302 is ready to configure an AP-client 304. Subsequent frames and/or packets exchanged between the AP-configurator 302 and the AP-client 304 may be transmitted via the WDS.

In a AP-client 304, activation of a button, located at the AP-client 304 may initiate step 606. In step 606, an AP-client timing window may be opened at the AP-client 304. The opening of the client timing window may correspond to the start of a time duration in which the AP-client 304 may request to be configured by an AP-configurator 302. The AP-client 304 may also start a discovery protocol. The discovery protocol comprises a process by which an AP-client 304 may locate an AP-configurator 302. The AP-client 304 may enter a mode in which a frame received via the WDS may be accepted by the AP-client 304. A frame received from an AP-configurator 302 may comprise configuration enablement information. The AP-client 304 may subsequently communicate the one or more messages to the AP-configurator 302, comprising configuration response information, based on a presence of configuration enablement information contained in a frame received via the WDS during a time interval in which the configurator timing window was open.

Steps 616, 618, 620, and 622 may comprise a packet exchange based on a protocol, in accordance with various embodiments of the invention. The packet exchange may utilize, but may not be limited to, the Diffie-Hellman (DH) protocol. In step 616, the AP-client station 304 may communicate a hello packet to the AP-configurator 302. The hello packet, associated with the step 616, may indicate to the AP-configurator 302 that the AP-client 304 is ready to be configured. In step 618, the AP-configurator 302, may communicate a key1 message to the AP-client 304. The key1 message, associated with the step 618, may comprise a configurator key. In step 620, the AP-client 304 may communicate a key2 message to the AP-configurator 302. The key2 message, associated with the step 620, may comprise a client key.

In step 622, the AP-configurator 302, may communicate a configuration message to the AP-client 304. The configuration message, associated with the step 622, may comprise configurator configuration information that may be utilized to configure the AP-client 304. The configurator configuration information communicated in the configuration message, associated with the step 622, may be encrypted based on the configurator key and/or the client key. In step 624, the AP-client 304 may communicate a status message to the AP-configurator 302. The status message 624 may be sent subsequent to decryption of at least a portion of the configuration message 622. The AP-client 304 may utilize the configurator key and/or the client key to decrypt at least a portion of the configuration message, associated with the step 622 that was previously encrypted by the AP-configurator 302. The status message, associated with the step 624, may indicate whether the AP-client 304 was successfully configured during the packet exchange. If the AP-client 304 was successfully configured, the status message associated with the step 624 may indicate success.

Also occurring in step 604, the AP-configurator 302 may also perform a role of a collocated device 208 functioning as a configurator within a BSS 342 in which the AP-configurator 302 is located. Consequently, a configurator timing window may also be opened at the AP-configurator 302 in step 604. The opening of the configurator timing window at the AP-configurator 302, in the role of collocated device 208 functioning as a configurator, may correspond to the start of a time duration in which the AP-configurator 302 may configure a requesting client station that is located in a common BSS 342 with the AP-configurator 302. The AP-configurator 302, in the role of collocated device 208 functioning as a configurator, may transmit beacon frames comprising authentication enablement information within the BSS 342.

In step 606, the AP-client may also function as a collocated device 208 functioning as a configurator within a BSS 344 in which the AP-client is located. Consequently, a configurator timing window may also be opened at the AP-client 304 in step 606. The opening of the configurator timing window at the AP-client 304, in the role of collocated device 208 functioning as a configurator, may correspond to the start of a time duration in which the AP-client 304 may configure a requesting client station 303 that is located in a common BSS 344 with the AP-client 304. The AP-client 304, in the role of collocated device 208 functioning as a configurator, may transmit beacon frames comprising authentication enablement information within the BSS 344.

U.S. application Ser. No. 11/207,302 filed Aug. 18, 2005, provides a detailed description of the discovery protocol and of procedures by which a collocated device 208 functioning as a configurator may configure a client station 204, and is hereby incorporated by reference in its entirety.

In operation, if the AP-client 304 receives a hello packet from a requesting client station 303 within the BSS 344 at a time instant prior to receiving a frame from the AP-configurator 302 via the WDS, the AP-client 304 may cease the discovery process by which the AP-client 304 scans to locate an AP-configurator. The AP-client 304 may function as collocated device 208 functioning as a configurator, and subsequently configure the requesting client station 303. The client station 303 may be configured by the AP-client 304 functioning as a configurator, based on configuration information that was generated by the AP-client functioning as a configurator.

If the AP-client 304 receives a beacon frame from the AP-configurator 302 via the WDS at a time instant prior to receiving a hello packet from a requesting client station 303 within the BSS 344, the AP-client 304 may cease transmitting beacon frames comprising authentication enablement information within the BSS 344. The AP-client 304 may also not respond to any subsequently received hello packets that were transmitted by a client station 303 within the BSS 344. Configuration of the AP-client 304 by the AP-configurator 302 may proceed. Subsequent to completion of configuration by the AP-configurator 302, for example subsequent to step 624, an activation of a button located at the configured AP-client 304 may result in the configured AP-client 304 functioning as a configurator, and a role of AP-configurator.

If the AP-configurator 302 receives a hello packet from a requesting client station within the BSS 342 at a time instant prior to receiving a hello packet from an AP-client 304 via the WDS, the AP-configurator 302 may, for example, cease transmission of beacon frames comprising configurator configuration information. The AP-configurator 302 may function as a configurator, and subsequently configure the requesting client station within the BSS 342. The requesting client station may be configured by the AP-configurator 302, in the role of collocated device 208 functioning as a configurator.

If the AP-configurator 302 receives a frame from an AP-client 304 via the WDS at a time instant prior to receiving a hello packet from a requesting client station within the BSS 342, the AP-configurator 302 may cease transmitting beacon frames comprising authentication enablement information within the BSS 342. The AP-configurator 302 may also not respond to any subsequently received hello packets that were transmitted by a client station within the BSS 342. The AP-configurator 302 may proceed with configuring the AP-client 304.

If a time duration for the button activation at the AP-configurator 302 corresponds to, for example, a "long" button activation, the AP-configurator 302 may be reset. The reset AP-configurator 302 may become unconfigured following the long button activation. A subsequent short button activation may follow the long button activation. The subsequent short button activation may open a configurator timing window. Subsequent to a closing of the configurator timing window, following the subsequent short button activation, the AP-configurator 302 may be configured as in, for example, step 602. Configuration of the AP-configurator 302 may comprise generating an SSID and/or passphrase. Subsequent to the closing of the configurator timing window, following the subsequent short button activation, the configured AP-configurator 302 may configure an AP-client 304. A configured AP-client may subsequently function as an AP-configurator when configuring a subsequent unconfigured AP-client 304. A configured AP-configurator 302, or AP-client 304 may function as a collocated device 208 operating as a configurator when configuring a client station 303. A configured AP-client 304 that functions as an AP-configurator, may supply configurator configuration information to an AP-client 304. A configured AP-configurator 302 or, AP-client 304 that functions as an AP-configurator, may communicate configuration information to a client station 303. An AP-configurator 302, or AP-client 304, which is not configured to communicate configuration information, or configurator configuration information, to a requesting client station 303, or to a requesting AP-client 304, may be referred to as an unconfigured AP-configurator 302 or AP-client 304.

If a time duration for the button activation at the configured AP-configurator 302 corresponds to for example a "short" button activation, the AP-configurator 302 may open the configurator timing window as in, for example, step 604. The button activation at the AP-client 304 may correspond to, for example a short button activation in step 606. The AP-client 304 may be unconfigured prior to the short button activation associated with step 606.

In one embodiment of the invention, the configuration enablement information may comprise a flag field, WDS-window_open. The WDS-window_open flag may be set to a Boolean value to indicate whether the configurator timing window, during which an AP-client 304 may be configured by the AP-configurator 302 via a WDS, is open or closed. A logical value WDS-window_open=TRUE, or a numerical value WDS-window_open=1 may indicate that the configurator timing window is open, for example. A logical value WDS-window_open=FALSE, or a numerical value WDS-window_open=0 may indicate that the configurator timing window is closed, for example. The configuration enablement information may comprise a flag field, recently_cfg, which may be set to a Boolean value to indicate whether the AP-configurator 302 is ready to configure an AP-client 304. A logical value recently_cfg=FALSE, or a numerical value recently_cfg=0 may indicate that the AP-configurator 302 is ready to configure an AP-client 304, for example. A logical value recently_cfg=TRUE, or a numerical value recently_cfg=1 may indicate that the AP-configurator 302 has already configured an AP-client 304 during the current configurator timing window open time interval and is not ready to configure an AP-client 304, for example.

At a time instant when a configurator timing window is opened, a subsequent first beacon message, associated with the step 605, may be transmitted by the AP-configurator 302. The message, associated with the step 605, may comprise flags WDS-window_open=TRUE, indicating that the configurator timing window is open, and recently_cfg=FALSE, indicating that the AP-configurator 302, is ready to configure an AP-client 304. Beacon frames transmitted by the AP-configurator, at instants in time during which the configurator timing window is not open may not comprise configurator enablement information.

In accordance with an embodiment of the invention, a button located at either the AP-configurator 302, or the AP-client 304, may comprise a hardware button, for example a physical button, and/or a software enabled button, for example, a glyph or icon that is displayed in a user interface.

Figure 7:
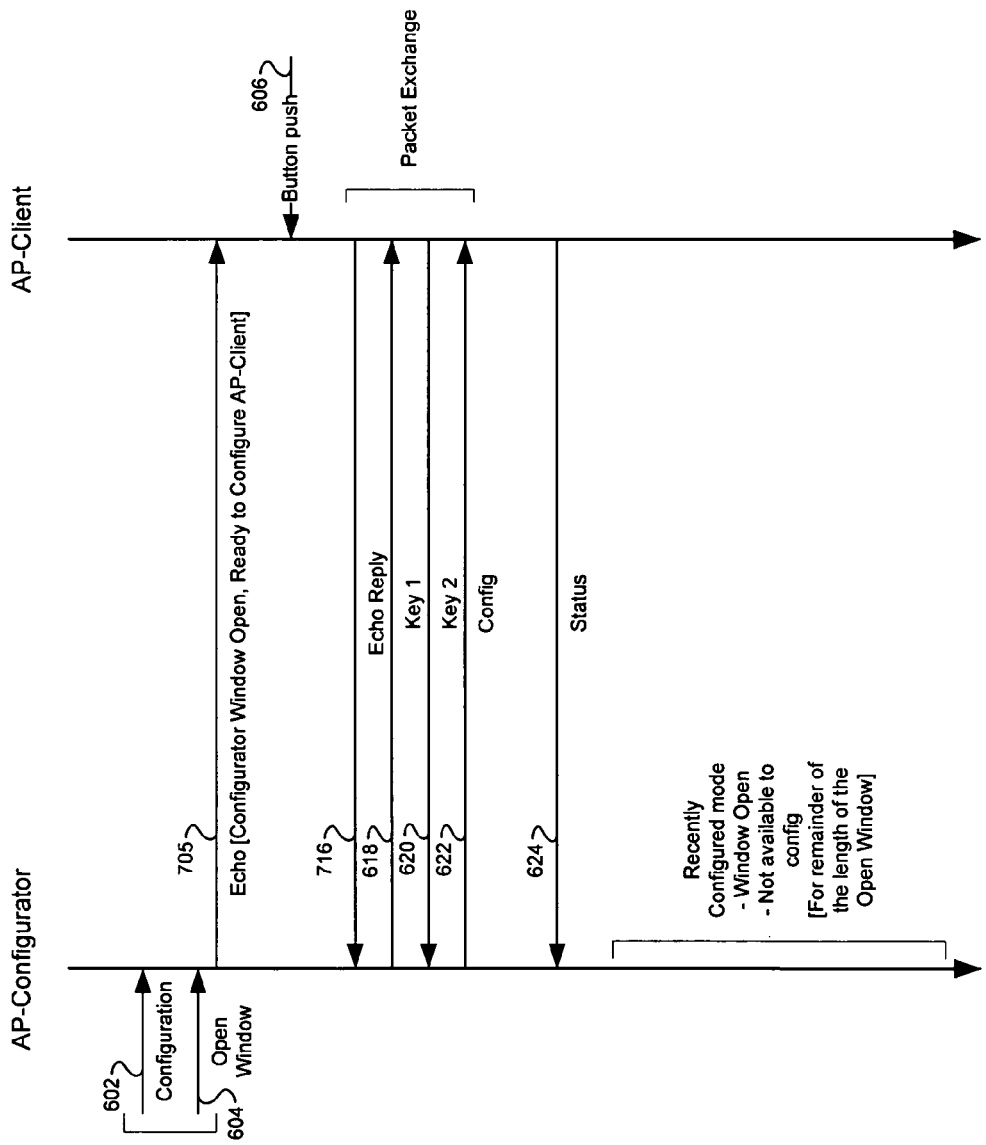
FIG. 7 is a diagram illustrating exemplary message exchanges between an AP-configurator and an AP-client via a wired DS, in accordance with an embodiment of the invention.

FIG. 7 is a diagram illustrating exemplary message exchanges between an AP-configurator and an AP-client via a wired DS, in accordance with an embodiment of the invention. In step 602, an AP-configurator 302 may be configured based on an activation of a button located at the AP-configurator 302. In step 604, a configured AP-configurator 302 may open a configurator timing window for a specific time duration. With regard to FIG. 7, steps 602, 604, 606, 618, 620, 622, and 624 are substantially as described with respect to FIG. 6.

Notwithstanding, in step 705, at a time instant subsequent to the opening of the configurator timing window in step 604, the AP-configurator 302, may transmit IEEE 802.11 echo frames comprising configuration enablement information and/or authentication enablement information, in accordance with an embodiment of the invention. The echo frame may be transported via a wired DS 510. The configuration enablement information may indicate that the configurator timing window is open, and that the AP-configurator 302 is ready to configure an AP-client 304. The echo frame may comprise information that is transported via a wired DS 510 utilizing the extensible authentication protocol (EAP), for example. Subsequent frames and/or packets exchanged between the AP-configurator 302 and the AP-client 304 may be transmitted via the wired DS 510.

In a AP-client 304, activation of a button, located at the AP-client 304 may initiate step 606. In step 606, an AP-client timing window may be opened at the AP-client 304. The opening of the client timing window may correspond to the start of a time duration in which the AP-client 304 may request to be configured by an AP-configurator 302. The AP-client 304 may also start a discovery protocol.

Steps 716, 618, 620, and 622 may comprise a packet exchange based on a protocol, in accordance with various embodiments of the invention. The packet exchange may utilize, but may not be limited to, the Diffie-Hellman (DH) protocol. In step 716, the AP-client station 304 may communicate an echo reply frame to the AP-configurator 302. The echo reply frame, associated with the step 616, may indicate to the AP-configurator 302 that the AP-client 304 is ready to be configured. In step 618, the AP-configurator 302, may communicate a key1 message to the AP-client 304. The key1 message, associated with the step 618, may comprise a configurator key. In step 620, the AP-client 304 may communicate a key2 message to the AP-configurator 302. The key2 message, associated with the step 620, may comprise a client key.

In step 622, the AP-configurator 302, may communicate a configuration message to the AP-client 304. The configuration message, associated with the step 622, may comprise configurator configuration information that may be utilized to configure the AP-client 304. The configurator configuration information communicated in the configuration message, associated with the step 622, may be encrypted based on the configurator key and/or the client key. In step 624, the AP-client 304 may communicate a status message to the AP-configurator 302. The status message 624 may be sent subsequent to decryption of at least a portion of the configuration message 622. The AP-client 304 may utilize the configurator key and/or the client key to decrypt at least a portion of the configuration message, associated with the step 622 that was previously encrypted by the AP-configurator 302. The status message, associated with the step 624, may indicate whether the AP-client 304 was successfully configured during the packet exchange. If the AP-client 304 was successfully configured, the status message associated with the step 624 may indicate a successful configuration.

In step 604, the AP-configurator 302 may also perform functioning as a configurator within a BSS 342 in which the AP-configurator 302 is located. Consequently, a configurator timing window may also be opened at the AP-configurator 302 in step 604. The opening of the configurator timing window at the AP-configurator 302 functioning as a configurator may correspond to the start of a time duration in which the AP-configurator 302 may configure a requesting client station that is located in a common BSS 342 with the AP-configurator 302. The AP-configurator 302 functioning as a configurator may transmit beacon frames comprising authentication enablement information within the BSS 342.

In step 606, the AP-client 304 may also function as a configurator within a BSS 344 in which the AP-client 304 is located. Consequently, a configurator timing window may also be opened at the AP-client 304 in step 606. The opening of the configurator timing window at the AP-client 304 functioning as a configurator may correspond to the start of a time duration in which the AP-client 304 may configure a requesting client station 303 that is located in a common BSS 344 with the AP-client 304. The AP-client 304, functioning as a configurator, may transmit beacon frames comprising authentication enablement information within the BSS 344.

If the AP-client 304 receives a hello packet from a requesting client station 303 within the BSS 344 at a time instant prior to receiving an echo reply frame from the AP-configurator 302 via the wired DS 510, the AP-client 304 may cease the discovery process by which the AP-client 304 scans to locate an AP-configurator 302. The AP-client 304 may function as a configurator, and subsequently configure the requesting client station 303. The client station 303 may be configured by the AP-client 304 functioning as a configurator, based on configuration information that was generated by the AP-client functioning as a configurator.

If the AP-client 304 receives an echo frame from the AP-configurator 302 via the wired DS 510 at a time instant prior to receiving a hello packet from a requesting client station 303 within the BSS 344, the AP-client 304 may cease transmitting beacon frames comprising authentication enablement information within the BSS 344. The AP-client 304 may not respond to any subsequently received hello packets that were transmitted by a client station 303 within the BSS 344. The AP-configurator 302 may proceed with configuring the AP-client 304. Subsequent to a completion of configuration by the AP-configurator 302, for example subsequent to step 624, an activation of, for example, a button located at the configured AP-client 304 may result in the configured AP-client 304 functioning as a configurator, and an AP-configurator.

If the AP-configurator 302 receives a hello packet from a requesting client station within the BSS 342 at a time instant prior to receiving an echo reply frame from an AP-client 304 via the wired DS 510, the AP-configurator 302 may, for example, cease transmission of echo frames comprising configurator configuration information. The AP-configurator 302 may function as a configurator, and subsequently configure the requesting client station within the BSS 342. The requesting client station may be configured by the AP-configurator 302 functioning as a configurator.

If the AP-configurator 302 receives an echo reply frame from an AP-client 304 via the wired DS 510 at a time instant prior to receiving a hello packet from a requesting client station within the BSS 342, the AP-configurator 302 may cease transmitting beacon frames comprising authentication enablement information within the BSS 342. The AP-configurator 302 may also not respond to any subsequently received hello packets that were transmitted by a client station within the BSS 342. The AP-configurator 302 may proceed with configuring the AP-client 304.

In accordance with an embodiment of the invention, the AP-client 304 may initiate discovery. In this regard, the AP-client 304 may initiate discovery by sending a broadcast echo-request. The AP-configurator 302 may respond with an echo-reply. The AP-client 304 may then initiate packet exchange by sending, for example, a hello packet. In another embodiment of the invention, the AP-configurator 302 may initiate discovery. In this regard, the AP-configurator 302 may initiate discovery by sending a broadcast message indicating its open window availability. The AP-client 304 may initiate packet exchange by sending a hello packet.

Figure 8A:
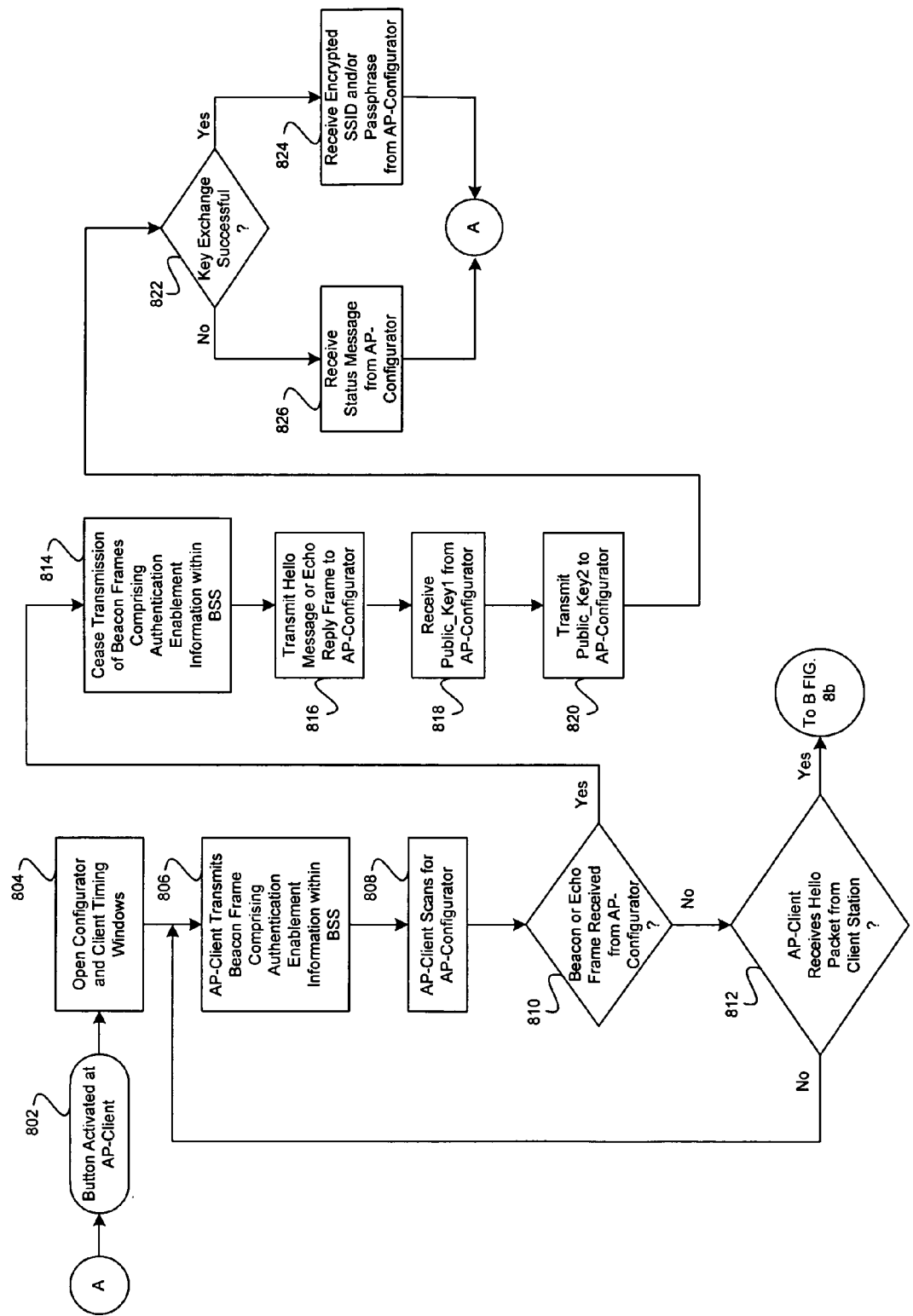
FIG. 8a is a flowchart illustrating exemplary steps performed by an AP-client, in accordance with an embodiment of the invention.

FIG. 8a is a flowchart illustrating exemplary steps performed by an AP-client, in accordance with an embodiment of the invention. Referring to FIG. 8a, in step 802 a button is activated at the AP-client 304. In step 804, the AP-client 304 may open a configurator timing window and a client timing window. The configurator timing window may enable the AP-client 304 to configure a requesting client station 303 located in a common BSS 344 with the AP-client 304. The client timing window may enable the AP-client 304 to be configured by an AP-configurator via a wired DS 510, or via a WDS. In step 806, the AP-client 304 may transmit a beacon frame comprising authentication enablement information within the BSS 344. In step 808, the AP-client 304 may scan for an AP-configurator 302 that may be utilized to configure the AP-client 304 via a wired DS or WDS.

In step 810, the AP-client 304 may determine if a beacon frame has been received from an AP-configurator 302 via a WDS, or whether an echo frame has been received from an AP-configurator 302 via a wired DS 510. If a beacon or echo frame has not been received, at step 812 the AP-client 304 may determine whether a hello packet has been received from a requesting client station 303 located in a common BSS 344 with the AP-client 304. If not, step 806 may follow.

If, in step 810, the AP-client 304 has received a beacon or echo frame, in step 814, the AP-client may cease transmission of beacon frames comprising authentication enablement information with the BSS 344. In step 816, the AP-client 304 may transmit a hello message to the AP-configurator 302 via a WDS. Alternatively, in step 816, the AP-client 304 may transmit an echo reply frame to the AP-configurator 302 via a wired DS 510. In step 818, the AP-client 304 may receive a key1 message, associated with the step 618, from the AP-configurator 302. In step 820, a key2 message, associated with the step 620, may be transmitted to the AP-configurator 302. Step 822 may determine if the key exchange with the AP-configurator 302, comprising messages associated with the steps 618 and 620 of FIG. 6, was successful. If the key exchange was successful, at step 824 a configuration message, associated with the step 622 of FIG. 6, may be received from the AP-configurator 302, comprising an SSID and/or encrypted passphrase. If the key exchange was not successful, at step 826, a status message, associated with the step 624 of FIG. 6, indicating failure may be received from the AP-configurator 302. Subsequent to steps 824 and/or 826, step 802 may follow. If, in step 812, the AP-client 304 has received a hello packet from the client station 303 in the BSS 344, then control passes to step 830, which is illustrated in FIG. 8b.

Figure 8B:
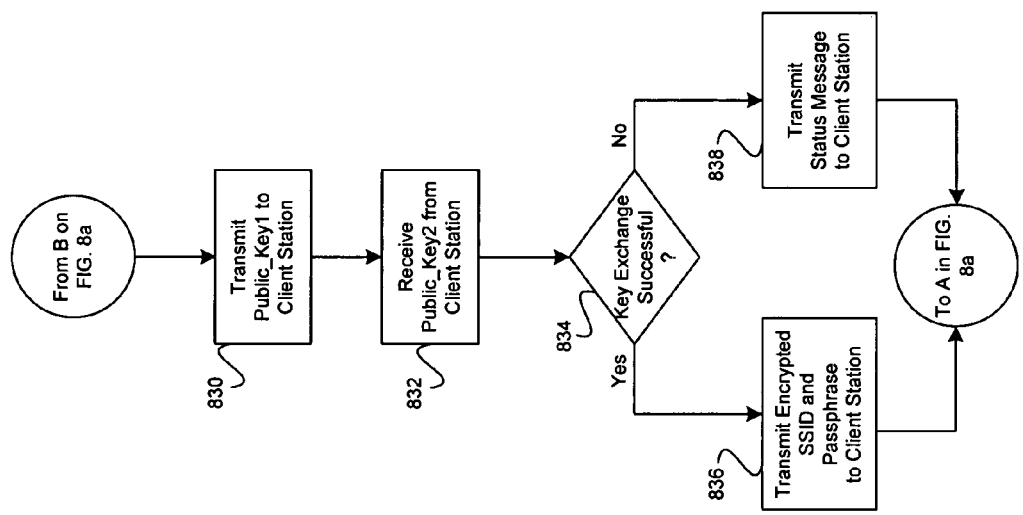
FIG. 8b is a flowchart, which is a continuation of FIG. 8a illustrating exemplary steps performed by an AP-client, in accordance with an embodiment of the invention.

FIG. 8b is a flowchart, which is a continuation of FIG. 8a illustrating exemplary steps performed by an AP-client, in accordance with an embodiment of the invention. If, in step 812 of FIG. 8a, the AP-client 304 has received a hello packet from the client station 303 in the BSS 344, then control passes to step 830. Referring to FIG. 8b, in step 830, the AP-client 304 may transmit a key1 message to the client station 303. In step 832, the AP-client 304 may receive a key2 message from the client station 303. In step 834, the AP-client 304 may determine whether the key exchange with the client station 303 was successful. If the key exchange was successful, in step 836, the AP-client 304 may transmit an SSID and/or encrypted passphrase to the client station 303. If the key exchange was not successful, at step 838, a status message, indicating failure, may be transmitted to the client station 303.

Figure 9A:
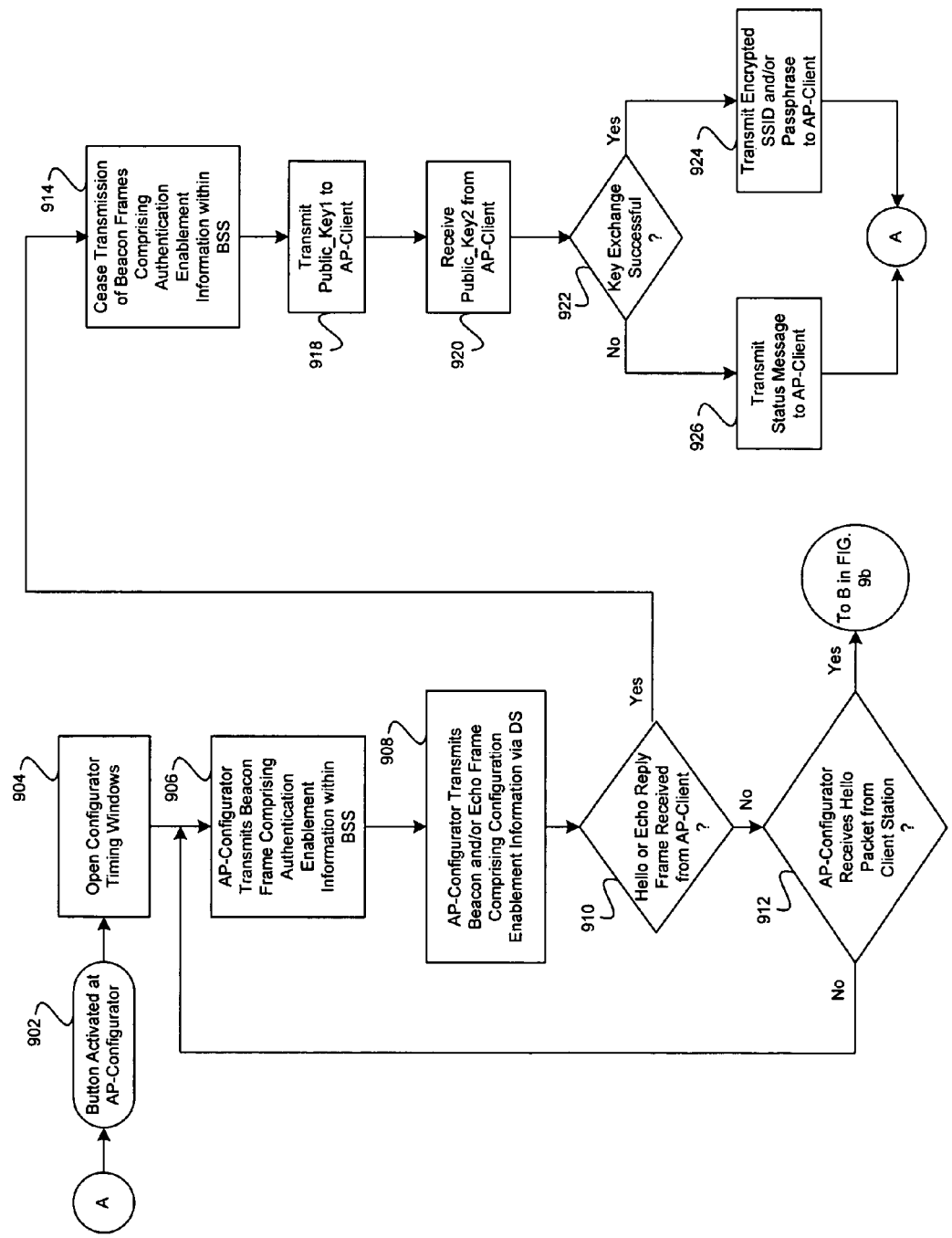
FIG. 9a is a flowchart illustrating exemplary steps performed by an AP-configurator, in accordance with an embodiment of the invention.

FIG. 9a is a flowchart illustrating exemplary steps performed by an AP-configurator, in accordance with an embodiment of the invention. Referring to FIG. 9a, in step 902 a button is activated at the AP-configurator 302. In step 904, the AP-configurator 302 may open configurator timing windows. One of the configurator timing windows may enable the AP-configurator 302 to configure a requesting client station located in a common BSS 342 with the AP-configurator 302. The subsequent configurator timing window may enable the AP-configurator 302 to configure an AP-client via a wired DS 510, or via a WDS. In step 906, the AP-configurator 302 may transmit a beacon frame comprising authentication enablement information within the BSS 342. In step 908, the AP-configurator 302 may transmit a beacon frame comprising configuration enablement information via a WDS. Additionally, in step 908, the AP-configurator 302 may transmit an echo frame comprising configuration enablement information via a wired DS 510.

In step 910, the AP-configurator 302 may determine whether a hello frame has been received from an AP-client 304 via a WDS, or whether an echo reply frame has been received from an AP-client 304 via a wired DS 510. If a hello or echo reply frame has not been received, at step 912 the AP-configurator 302 may determine whether a hello packet has been received from a requesting client station located in a common BSS 342 with the AP-configurator 302. If not, step 906 may follow.

Figure 9B:
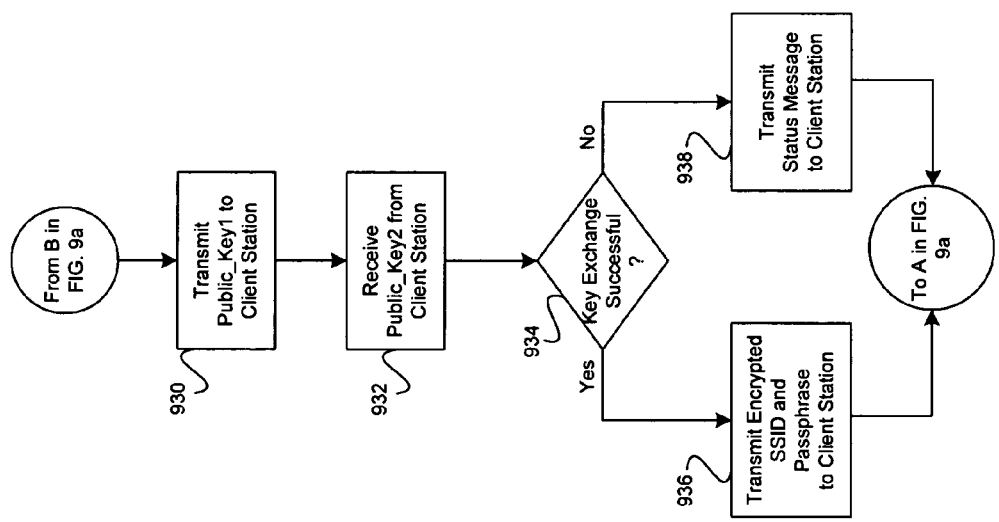
FIG. 9b is a flowchart, which is a continuation of FIG. 9a illustrating exemplary steps performed by an AP-configurator, in accordance with an embodiment of the invention.

If, in step 910, the AP-configurator 302 has received a hello or echo reply frame, in step 914, the AP-configurator 302 may cease transmission of beacon frames comprising authentication enablement information with the BSS 342. In step 918, the AP-configurator 302 may transmit a key1 message, associated with the step 618 of FIG. 6, to the AP-client 304. In step 920, a key2 message, associated with the step 620 of FIG. 6, may be received from the AP-client 304. Step 922 may determine if the key exchange with the AP-client 304, comprising messages associated with the steps 618 and 620 of FIG. 6, was successful. If the key exchange was successful, at step 924 a configuration message, associated with the step 622, may be transmitted to the AP-client 304, comprising an SSID and/or encrypted passphrase. If the key exchange was not successful, at step 926, a status message, associated with the step 624 of FIG. 6, indicating failure may be transmitted to the AP-client 304. Subsequent to steps 924 and/or 926, step 902 may follow. If, in step 912, the AP-configurator 302 has received a hello packet from the client station in the BSS 342, control passes to step 930 in FIG. 9b FIG. 9b is a flowchart, which is a continuation of FIG. 9a illustrating exemplary steps performed by an AP-configurator, in accordance with an embodiment of the invention. If, in step 912 of FIG. 9a, the AP-configurator 302 has received a hello packet from the client station in the BSS 342, control passes to step 930. Referring to FIG. 9b, in step 930, the AP-configurator 302 may transmit a key1 message to the client station. In step 932, the AP-configurator 302 may receive a key2 message from the client station. In step 934, the AP-configurator 302 may determine whether the key exchange with the client station was successful. If the key exchange was successful, in step 936, the AP-configurator 302 may transmit an SSID and/or encrypted passphrase to the client station. If the key exchange was not successful, at step 938, a status message, indicating failure, may be transmitted to the client station. In accordance with an embodiment of the invention software or code may be provided, which possess the capability to determine whether an AP may function as an AP-configurator or as an AP-client. In this regard, the software or code may determine which of FIGS. 8a and 8b or FIGS. 9a and 9b state machine should be executed. An AP that is already configured may function as an AP-configurator. An AP that is not already configured either manually or by another AP-configurator may function as an AP-client.

An AP may become unconfigured subsequent to a long button activation at the AP. Following a short button activation at a configured AP, the AP may open a configurator timing window and function as an AP-configurator. Following a short button activation at an unconfigured AP, the AP may open a configurator timing window and function as an AP-client. If the AP functioning as an AP-client receives a beacon or echo frame from an AP-configurator during the open configurator timing window, the AP functioning as an AP-client may be configured by the AP-configurator as described in FIGS. 8a and 8b. If the AP functioning as an AP-client does not receive a beacon or echo frame from an AP-configurator during the open configurator timing window, the AP functioning as an AP-client may configure itself by generating an SSID and/or passphrase. Subsequent to a closing of the configurator timing window, the AP functioning as an AP-client may become configured and subsequently function as an AP-configurator following a subsequent short button activation as described in FIGS. 9a and 9b.

Figure 10:
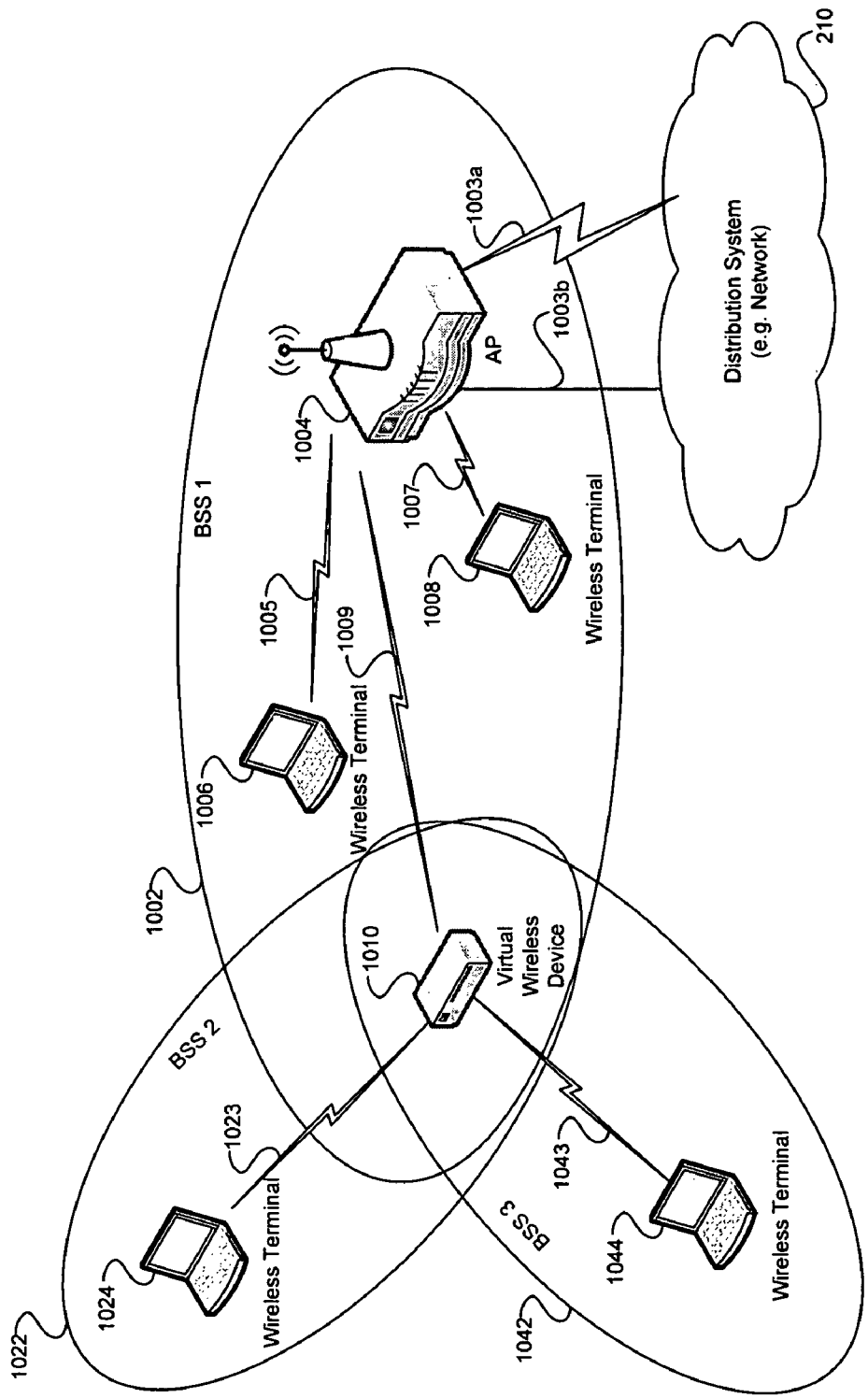
FIG. 10 is a block diagram of an exemplary virtual wireless device, in accordance with an embodiment of the invention.

FIG. 10 is a block diagram of an exemplary virtual wireless device, in accordance with an embodiment of the invention. Referring to FIG. 10, there is shown a plurality of basic service sets (BSS) 1002, 1022 and 1042, and a distribution system (DS) 210. The BSS 1002 may comprise a collocated device 1004, a plurality of wireless terminals 1006 and 1008, a virtual wireless device 1010, a plurality of RF channels 1003a, 1005, 1007 and 1009, and a wired interface 1003b.

The BSS 1022 may comprise a wireless terminal 1024, the virtual wireless device 1010, and RF channel 1023. The BSS 1042 may comprise a wireless terminal 1044, the virtual wireless device 1010, and RF channel 1043.

The collocated device 1004 may communicate information to the DS 210 via the RF channel 1003a and/or the wired interface 1003b. The wireless terminal 1006 may communicate information within BSS 1002 via the RF channel 1005. The wireless terminal 1008 may communicate information within BSS 1002 via the RF channel 1007. The virtual wireless device 1010 may communicate information within BSS 1002 via the RF channel 1009. The wireless terminal 1024 may communicate information within BSS 1022 via RF channel 1023. The wireless terminal 1044 may communicate information within BSS 1042 via RF channel 1043. The collocated device 1004 is substantially as described for the collocated device 208 (FIG. 2). The plurality of wireless terminals 1006, 1008, 1024 and 1044 are substantially as described for the client station 204 (FIG. 2).

The virtual wireless device 1010 may comprise a plurality of wireless interfaces that may be individually configured to function as a client station or collocated device. For example, one wireless interface located at the virtual wireless device 1010 may function as a client station in BSS 1002. Subsequent wireless interfaces located at the virtual wireless device 1010 may function as collocated devices in BSS 1022 and 1042. The virtual wireless device 1010 may comprise the functionality of a client station 204 within the BSS 1002. The virtual wireless device 1010, which may be located within the BSS 1010, may be configured by a collocated device 1004 functioning as a configurator, also located in BSS 1010. A configured virtual wireless device 1010 may comprise the functionality of a configurator within BSS 1022 and 1042. The virtual wireless device 1010 may be a member of a plurality of BSSs. The virtual wireless device 1010 may function in a corresponding plurality of roles among the plurality of BSS. The virtual wireless device 1010 may create additional BSSs 1022 and 1042. The virtual wireless device 1010 functioning as a client station may be a member of BSS 1002. The virtual wireless device 1010 functioning as a configurator may be a member of BSS 1022. The virtual wireless device 1010 functioning as a configurator may be a member of BSS 1042.

The virtual wireless device 1010 functioning as a client station, which may be located within BSS 1022, may be configured as a client station by the collocated device 1004 functioning as a configurator, also located within BSS 1022, in accordance with various embodiments of the invention. The virtual wireless device 1010 functioning as a configurator, located within BSS 1022, may configure a wireless terminal 1024, also located within BSS 1022, in accordance with various embodiments of the invention. The virtual wireless device 1010 functioning as a configurator, located within BSS 1042, may configure a wireless terminal 1044, also located within BSS 1042, in accordance with various embodiments of the invention.

U.S. application Ser. No. 11/207 302 filed Aug. 18, 2005, provides a detailed description of procedures by which a collocated device 1004 functioning as a configurator may configure a virtual wireless device 1010 functioning as a client station, and of procedures by which a virtual wireless device 1010 functioning as a configurator may configure a client station 1024, and is hereby incorporated by reference in its entirety.

Another embodiment of the invention provides a machine-readable storage having stored thereon, a computer program having at least one code section for enabling communication of information in a secure communication system, the at least one code section being executable by a machine for causing the machine to perform steps described herein.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling communication of information in a secure communication system, the method comprising:
   receiving at first access point functioning as an AP-client, configuration information from second access point functioning as an AP-configurator via a network;
   configuring said first access point functioning as said AP-client to function as a configurator based on said received configuration information; and
   configuring by said first access point functioning as said configurator, one or both of a client station and another access point functioning as an AP-client.

2. The method according to claim 1, comprising configuring said one or both of said client station and said another access point functioning as said AP-client based on at least a portion of said received configuration information.

3. The method according to claim 2, comprising selecting one of said client station or said another access point functioning as said AP-client based on receiving one or both of authentication response information and configuration response information.

4. The method according to claim 3, comprising opening one or both of a configurator timing window and a client timing window at a time instant that precedes said selecting.

5. The method according to claim 3, comprising configuring said selected one of said client station or said another access point functioning as said AP-client.

6. The method according to claim 1, comprising communicating one or both of a service set identifier and a passphrase during said configuring of said one or both of said client station and said another access point functioning as said AP-client.

7. A system for enabling communication of information in a secure communication system, the system comprising:
one or more processors and/or circuits for use in first access point functioning as an AP-client, said one or more processors and/or circuits being operable to:
receive configuration information from second access point functioning as an AP-configurator via a network;
configure said first access point functioning as said AP-client to function as a configurator based on said received configuration information; and
configure one or both of a client station and another access point functioning as an AP-client.

8. The system according to claim 7, wherein said one or more processors and/or circuits are operable to configure said one or both of said client station and said another access point functioning as said AP-client based on at least a portion of said received configuration information.

9. The system according to claim 8, wherein said one or more processors and/or circuits are operable to select one of said client station or said another access point functioning as said AP-client based on receiving one or both of authentication response information and configuration response information.

10. The system according to claim 9, wherein said one or more processors and/or circuits are operable to open one or both of a configurator timing window and a client timing window at a time instant that precedes said selecting.

11. The system according to claim 9, wherein said one or more processors and/or circuits are operable to configure said selected one of said client station or said another access point functioning as said AP-client.

12. The system according to claim 7, wherein said one or more processors and/or circuits are operable to communicate one or both of a service set identifier and a passphrase during said configuring of said one or both of said client station and said another access point functioning as said AP-client.

13. A non-transitory machine-readable storage having stored thereon, a computer program having at least one code section for enabling communication of information in a secure communication system, the at least one code section being executable by a machine for causing the machine to perform steps comprising:
receiving at first access point functioning as an AP-client, configuration information from second access point functioning as an AP-configurator via a network;
configuring said first access point functioning as said AP-client to function as a configurator based on said received configuration information; and
configuring by said first access point functioning as said configurator, one or both of a client station and another access point functioning as an AP-client.

14. The non-transitory machine-readable storage according to claim 13, wherein said at least one code section comprises code for configuring said one or both of said client station and said another access point functioning as said AP-client based on at least a portion of said received configuration information.

15. The non-transitory machine-readable storage according to claim 14, wherein said at least one code section comprises code for selecting one of said client station or said another access point functioning as said AP-client based on receiving one or both of authentication response information and configuration response information.

16. The non-transitory machine-readable storage according to claim 15, wherein said at least one code section comprises code for opening one or both of a configurator timing window and a client timing window at a time instant that precedes said selecting.

17. The non-transitory machine-readable storage according to claim 15, wherein said at least one code section comprises code for configuring said selected one of said client station or said another access point functioning as said AP-client.

18. The non-transitory machine-readable storage according to claim 13, wherein said at least one code section comprises code for communicating one or both of a service set identifier and a passphrase during said configuring of said one or both of said client station and said another access point functioning as said AP-client.

* * * * *